(12) United States Patent
Fuder et al.

(10) Patent No.: US 7,795,488 B2
(45) Date of Patent: Sep. 14, 2010

(54) PROCESS FOR THE REMOVAL OF OXYGENATES FROM A GASEOUS STREAM

(75) Inventors: Franz Fuder, Bottrop (DE); David Charles Wilson, Perthshire (GB)

(73) Assignee: Ineos Europe Limited, Hampshire (GB)

( * ) Notice: Subject to any disclaimer, the term of this patent is extended or adjusted under 35 U.S.C. 154(b) by 270 days.

(21) Appl. No.: 12/086,926

(22) PCT Filed: Dec. 12, 2006

(86) PCT No.: PCT/GB2006/004650

§ 371 (c)(1),
(2), (4) Date: Jun. 23, 2008

(87) PCT Pub. No.: WO2007/071926

PCT Pub. Date: Jun. 28, 2007

(65) Prior Publication Data

US 2009/0014358 A1    Jan. 15, 2009

(30) Foreign Application Priority Data

Dec. 23, 2005  (EP) .................. 05258045
Dec. 23, 2005  (EP) .................. 05258046
Dec. 23, 2005  (EP) .................. 05258047
Dec. 23, 2005  (EP) .................. 05258048

(51) Int. Cl.
*C07C 7/10* (2006.01)
(52) U.S. Cl. .................. 585/809; 585/833; 585/834; 585/867
(58) Field of Classification Search .............. 585/809, 585/833, 843, 867
See application file for complete search history.

(56) References Cited

U.S. PATENT DOCUMENTS

| 3,663,641 | A  | * | 5/1972 | Hanson .................. 585/868 |
| 4,686,317 | A  | * | 8/1987 | Quann et al. .............. 585/860 |
| 5,194,143 | A  |   | 3/1993 | Roling |
| 7,388,120 | B2 | * | 6/2008 | van Egmond ............ 585/809 |
| 7,465,846 | B2 | * | 12/2008 | de Wet et al. ............ 585/864 |
| 2003/0199721 | A1 | * | 10/2003 | Ding et al. ............... 585/807 |
| 2003/0199722 | A1 | * | 10/2003 | Lattner et al. ............ 585/809 |
| 2004/0122268 | A1 | * | 6/2004 | Van Egmond ............ 585/326 |
| 2004/0267069 | A1 | * | 12/2004 | Ding et al. ............... 585/329 |
| 2006/0122449 | A1 | * | 6/2006 | van Egmond ............ 585/809 |

FOREIGN PATENT DOCUMENTS

| EP | 0 992 568 A2 | 4/2000 |
| GB | 1021346 | 3/1966 |
| WO | WO 01/64609 A1 | 9/2001 |

* cited by examiner

*Primary Examiner*—Tam M Nguyen
(74) *Attorney, Agent, or Firm*—Nixon & Vanderhye

(57) ABSTRACT

The present invention relates to a process for the removal of oxygenates from a gaseous stream also comprising carbon dioxide, said process comprising: a) providing a first gaseous stream comprising one or more mono-olefin(s), at least 100 ppm (by weight) of one or more oxygenates and at least 0.1 wt % carbon dioxide, and b) treating the first gaseous stream to produce a second gaseous stream comprising one or more mono-olefin(s) and at least 0.1 wt % carbon dioxide with reduced oxygenate content, wherein said treating comprises contacting the first gaseous stream with a first aqueous stream and with a first liquid hydrocarbon stream, and c) subsequently treating the second gaseous stream to remove the carbon dioxide therein.

8 Claims, 1 Drawing Sheet

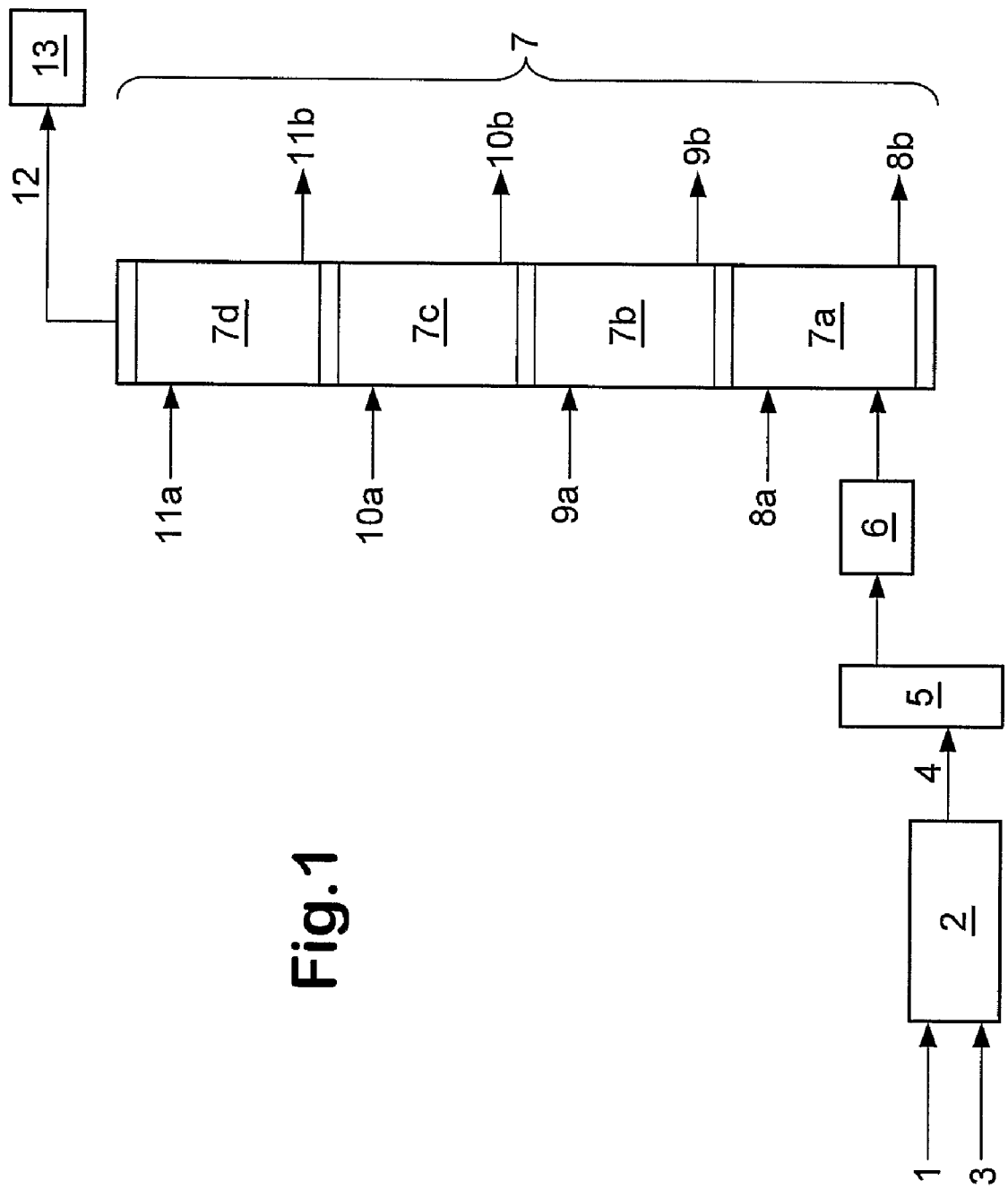

PROCESS FOR THE REMOVAL OF OXYGENATES FROM A GASEOUS STREAM

This application is the U.S. national phase of International Application No. PCT/GB2006/004650 filed 12 Dec. 2006 which designated the U.S. and claims priority to 05258046.1; 05258048.7; 05258047.9, and 05258045.3 filed 23 Dec. 2005, respectively, the entire contents of each of which are hereby incorporated by reference.

The present invention relates to a process for the removal of oxygenates from a gaseous stream also comprising one or more mono-olefin(s) and carbon dioxide, and particularly to a process for the removal of oxygenates from a product stream resulting from an autothermal cracking process.

Autothermal cracking is a route to olefins in which a hydrocarbon feed is mixed with oxygen and passed over an autothermal cracking catalyst. Combustion is initiated on the catalyst surface and the heat required to raise the reactants to process temperature and to carry out the endothermic cracking process is generated in situ. The product stream from the autothermal cracking process typically produces a gaseous stream comprising one or more olefins, oxygenates, carbon dioxide and carbon monoxide. Such a process is described for example in EP 332289B; EP-529793B; EP-A-0709446 and WO 00/14035.

The problems associated with the presence of oxygenates in carbon dioxide removal systems are known. WO 01/64609, for example, describes the problems of polymer formation in an acid gas recovery unit utilising alkanolamines to remove carbon dioxide. WO 01/64609 describes the use of heavy aromatic solvents in combination with the aqueous alkanolamine solution in the acid gas recovery unit to remove polymers formed and minimise contamination of the overheads from the unit.

US 2005/224394 and EP 0264280 A2 also both describe the problems of carbonyl compounds, such as acetaldehyde, forming polymers in caustic or amine wash units conventionally used for carbon dioxide removal. Both of these documents describe addition of inhibitors directly to a carbon dioxide removal unit to inhibit polymer formation and remove the oxygenates. As described in US 2005/224394 there are numerous problems with using either aromatic solvents or inhibitors in such units. Heavy aromatic solvents, for example, can become contaminated with basic materials, such as caustic or alkanolamines, which prevent the further processing of the solvent.

The present invention avoids the problems of the art above by providing a separate oxygenate removal step which is performed prior to carbon dioxide removal.

The use of caustic washes to react with oxygenates is well known in the art. However, such streams may also react with carbon oxides and hence are less suitable for use when large amounts of carbon dioxide are present.

The use of sodium bisulphite to separate oxygenates, such as aldehydes, via complex formation is also well known in the art, and is described, for example, in U.S. Pat. No. 3,816,478, U.S. Pat. No. 5,157,205 or U.S. Pat. No. 6,037,516. Again, however, there are problems that must be overcome in applying this to gaseous streams also containing significant amounts of carbon dioxide.

Thus, an alternative method to remove oxygenates from a gaseous stream also comprising carbon dioxide to produce a gaseous stream with lower oxygenate content is desired.

Accordingly the present invention provides a process for the removal of oxygenates from a gaseous stream also comprising carbon dioxide, said process comprising:

a) providing a first gaseous stream comprising one or more mono-olefin(s), at least 100 ppmw of one or more oxygenates and at least 0.1 wt % carbon dioxide, b) treating the first gaseous stream to produce a second gaseous stream comprising one or more mono-olefin(s) and at least 0.1 wt % carbon dioxide with a reduced oxygenate content, wherein said treating comprises contacting the first gaseous stream with a first aqueous stream and with a first liquid hydrocarbon stream, and c) subsequently treating the second gaseous stream to remove the carbon dioxide therein.

Preferably, the first gaseous stream comprising one or more mono-olefin(s), at least 100 ppmw (parts per million by weight) of one or more oxygenates and at least 0.1 wt % carbon dioxide is provided at a pressure of at least 5 barg, for example in the range 5 to 35 barg, most preferably 10 to 30 barg. The contacting of the first gaseous stream with the first aqueous stream and of the first gaseous stream with the first liquid hydrocarbon stream are preferably both performed at as close as possible to this pressure, although a small pressure drop is usually inevitable. Thus, the contacting of the first gaseous stream with the first aqueous stream and of the first gaseous stream with the first liquid hydrocarbon stream are preferably each performed at pressures of at least 5 barg, such as between 5 and 35 barg, and most preferably at pressures in the range 10 to 35 barg.

In a preferred embodiment of the invention the first gaseous stream comprising one or more mono-olefin(s), at least 100 ppmw of one or more oxygenates and at least 0.1 wt % carbon dioxide is a product stream resulting from an autothermal cracking process wherein the process comprises partially combusting a mixture of a hydrocarbon feed and a molecular oxygen containing gas in contact with a catalyst capable of supporting combustion beyond the normal fuel rich limit of flammability.

Typically, the product stream from the autothermal cracking reaction comprises ethene, propene, butene, higher mono-olefins, dienes, oxygenates, carbon monoxide and carbon dioxide. In addition, the product stream generally also comprises alkanes, such as methane and ethane, acetylenes, aromatics, water and hydrogen.

Hence, in a preferred embodiment, the present invention provides an autothermal cracking process for the production of one or more mono-olefins, said process comprising:

a) autothermally cracking a mixture of a hydrocarbon feed and a molecular oxygen-containing gas by contacting said mixture with a catalyst capable of supporting combustion beyond the normal fuel rich limit of flammability, to provide a first gaseous stream comprising one or more mono-olefin(s), at least 100 ppmw of one or more oxygenates and at least 0.1 wt % carbon dioxide, b) treating the first gaseous stream to produce a second gaseous stream comprising one or more mono-olefin(s) and at least 0.1 wt % carbon dioxide with a reduced oxygenate content, wherein said treating comprises contacting the first gaseous stream with a first aqueous stream and with a first liquid hydrocarbon stream, and c) subsequently treating the second gaseous stream to remove the carbon dioxide therein.

Preferably the autothermal cracking process is operated at a pressure of greater than 5 barg, for example in the range 5 to 35 barg, most preferably 10 to 35 barg, to give a first gaseous stream with a pressure in these ranges. The contacting of the first gaseous stream with the first aqueous stream and the gaseous stream with the first liquid hydrocarbon stream are also preferably both performed at as close as possible to this pressure as described above.

The first gaseous (product) stream from the autothermal cracking reaction will generally, in addition to any oxygenates, comprise, as the major components, 1-5 wt % hydrogen, less than 0.5 wt % oxygen, 5-30 wt % methane, 10-25 wt % carbon monoxide, 0.1-5 wt % carbon dioxide, 20-40 wt % ethene, 10-40 wt % ethane, and 1-15 wt % propene. (Unless stated otherwise, all concentrations herein are provided as weight percent or parts per million by weight (ppmw)).

Thus, the first gaseous stream comprising one or more mono olefin(s), one or more oxygenates and carbon dioxide may also comprise molecular oxygen. For example, where the first gaseous stream is a product stream resulting from an autothermal cracking process, said stream may comprise molecular oxygen if the molecular oxygen fed to the process has not been completely consumed in the auto-thermal cracking reaction.

After contacting of the first gaseous stream with the first aqueous stream and the first liquid hydrocarbon stream according to step (b) of the process of the present invention, there is obtained a second gaseous stream with reduced oxygenates content, which may be passed to conventional cracked gas treatment steps, such as oxygen removal (where necessary), carbon dioxide removal and olefin separation steps.

Step (b) of the present invention comprises a number of contacting steps of the gaseous stream with respective liquid streams, including the first aqueous stream and the first liquid hydrocarbon stream, and optionally other streams as will be described further below. The various contacting steps may each be performed in separate contacting towers, but preferably at least some of the contacting steps are performed in a contacting tower in which multiple sections are present in which the respective contacting steps may occur. More preferably, all the contacting steps may be performed in a single contacting tower with multiple contacting sections.

For avoidance of doubt, therefore, although the contacting in each contacting step of the present invention will hereinafter be described by reference to a "contacting tower", the description will equally apply to a single section in a contacting tower with multiple contacting sections.

Each contacting tower preferably comprises a packed or trayed column. Each contacting tower will have one or more theoretical stages, preferably more than 1 theoretical stages, and more preferably more than 5

Typically, each contacting tower is designed to have a low pressure drop, for example, 500 mbar or lower in each contacting step. The tower(s) are designed so that liquid flow rate maintains, in the case of a trayed column, the liquid levels on the trays without flooding or, in the case of a packed column maintains adequate wetting of the packing without flooding, typically at between 20% and 80% of flooding rates.

For avoidance of any doubt, in step (b) the amount of carbon dioxide removed is generally minimised, the majority of the carbon dioxide being removed subsequently in step (c). Thus, the first aqueous stream and first liquid hydrocarbon stream should be substantially free of any components that would react or complex with the carbon dioxide in step (b), by which is meant that said streams should each generally have less than 2 wt % of any such components. For example, the first aqueous stream is suitably relatively clean water, by which is meant comprises at least 95 wt % water, such as at least 98 wt % water. Similarly, the first liquid hydrocarbon stream suitably comprises at least 95 wt % liquid hydrocarbons, such as at least 98 wt % liquid hydrocarbons.

In step (c) of the process of the present invention, the second gaseous stream, comprising one or more mono-olefins and carbon dioxide with a reduced oxygenate content is subsequently treated to remove the carbon dioxide therein.

The carbon dioxide removal may be by any suitable technique, preferably by contacting with an amine-based absorption system such as MEA or DGA digycolamine or TEA (or mixtures).

Thus, the process of the present invention removes both oxygenates and carbon dioxide to produce a product stream comprising the desired mono-olefin(s).

The oxygenates present in the first gaseous stream comprising one or more mono-olefin(s), one or more oxygenates and carbon dioxide usually comprise at least one of an ether, aldehyde, ketone, ester, carboxylic acid, alcohol or a mixture thereof.

Preferably the oxygenates comprise at least one of an aldehyde, a ketone, an ester or a carboxylic acid, or a mixture thereof.

Wherein the oxygenate is a ketone the oxygenate may be at least one of acetone, 2-butanone, 2-pentanone, 3-pentanone.

Wherein the oxygenate is an aldehyde the oxygenate may be at least one of formaldehyde, acetaldehyde, propionaldehyde, butyraldehyde, isobutyraldehyde, crotonaldehyde, or a mixture thereof.

Wherein the oxygenate is an ester the oxygenate may be at least one of methyl formate, ethyl formate, propyl formate, butyl formate, isobutyl formate, methyl acetate, ethyl acetate, propyl acetate, butyl acetate, isobutyl acetate, or a mixture thereof.

Wherein the oxygenate is a carboxylic acid the oxygenate may be at least one of formic acid, acetic acid, propionic acid, butyric acid, isobutyric acid or a mixture thereof.

Preferably the one or more oxygenates comprises one or more aldehydes and most preferably acetaldehyde, formaldehyde or crotonaldehyde, or mixtures of.

The one or more oxygenates are usually present in the first gaseous stream (prior to treatment) at a total concentration of at least 200 ppmw, such as at least 500 ppmw. The one or more oxygenates will typically be present in the first gaseous stream (prior to treatment) at a total concentration of up to 10,000 ppmw, such as up to 5000 ppmw. For example, wherein the one or more oxygenates comprises one or more aldehydes, the individual aldehydes may typically be present in the following ranges: formaldehyde 10-200 ppmw, acetaldehyde 100-1000 ppmw, acetone 10-500 ppmw and crotonaldehyde <1-200 ppmw.

Typically, the process of step (b) of the present invention removes at least 80% by weight of the oxygenates present in the first gaseous stream, preferably at least 95% by weight.

The carbon dioxide is present in the first gaseous stream to be treated in an amount of at least 0.1 wt %, usually at least 0.25 wt %. The carbon dioxide will typically be present in the first gaseous stream to be treated in an amount of up to 5 wt %.

Similarly, the carbon dioxide is present in the second gaseous stream in an amount of at least 0.1 wt %, usually at least 0.25 wt %. The carbon dioxide will typically be present in the second gaseous stream in an amount of up to 5 wt %.

In a preferred embodiment of the present invention, step (b) of the present invention also comprises contacting the first gaseous stream (which may be a product stream from an autothermal cracking process) with water as a preliminary oxygenate removal step prior to treatment with the first aqueous stream and first liquid hydrocarbon stream. This preliminary oxygenate removal step removes some of the oxygenates, to produce a gaseous stream comprising one or more mono-olefin(s), the remaining oxygenates, and carbon dioxide, which is subsequently treated with the first aqueous stream and the first liquid hydrocarbon stream. In general, the preliminary oxygenate removal step removes the oxygenate components that are most readily soluble in water, and reduces the amount of oxygenate removal required in the subsequent treatment.

In general, the lower the temperature of the water wash, the more oxygenate that is removed in this step, and, hence, the less oxygenate that must be removed subsequently.

Typically, the preliminary oxygenate removal step is performed at a temperature (cooling water temperature) in the range from 5° C. to 190° C., preferably at a temperature of less than 50° C., and most preferably in the range from 25° C. to 40° C.

The pressure of the preliminary oxygenate removal step is preferably essentially the same as that of the provided first gaseous stream, although a small pressure drop may be inherent. Thus, typically, the preliminary oxygenate removal step is performed at a pressure of at least 5 barg, such as from 5 to 35 barg, and most preferably at a pressure in the range 10 to 35 barg.

The water removed from the preliminary oxygenate removal step comprises oxygenates. Preferably, at least a portion of this water is treated to remove at least some of the oxygenates therein, before the water is recycled and reused as the wash water in the preliminary oxygenate removal step again. A preferred method of treatment is to pass the water comprising oxygenates to a water stripper, wherein said water is contacted with a stripping gas, such as air or nitrogen, but preferably steam, to remove at least some of said oxygenates. The removed oxygenates may be burnt, for example in a suitable incinerator. The water stripper is typically operated at a pressure of up to 5 bar (suitable pressure for the effluent to be fed into a suitable fuel system or an incinerator) using low pressure steam at a temperature of up to 150° C., such as 120° C. to 150° C.

Prior to passing the water comprising oxygenates to the water stripper it is preferably treated to remove any organic phase that may be present, for example, to remove any hydrocarbons that have been entrained in the water during the contacting of the water with the first gaseous stream. This is typically achieved using a decanter.

Prior to treatment to remove oxygenates, the water comprising oxygenates removed from the preliminary oxygenate removal step may be combined with other aqueous streams comprising oxygenates which are obtained in the process of the present invention, examples of which are described below, and the combined stream treated to remove the oxygenates therein, preferably by decantation to remove any organic phase followed by stripping in a water stripper as described above.

In the process of the present invention, the first gaseous stream comprising one or more mono-olefin(s), at least 100 ppmw of one or more oxygenates, and at least 0.1 wt % carbon dioxide, optionally after any preliminary oxygenate removal step, is contacted, preferably by contacting countercurrently, with a first aqueous stream and with a first liquid hydrocarbon stream. This contacting may be performed in any suitable order. Thus, the first gaseous stream may be contacted first with the first liquid hydrocarbon stream, preferably by contacting countercurrently, and subsequently with the first aqueous stream, again preferably by contacting countercurrently. Alternatively, and preferably, the first gaseous stream may be contacted first with the first aqueous stream, preferably by contacting countercurrently, and subsequently with the first liquid hydrocarbon stream, again preferably by contacting countercurrently.

During contacting of the first gaseous stream comprising one or more mono-olefin(s), oxygenates, and carbon dioxide with the first aqueous stream, the first aqueous stream will absorb oxygenates and produce a second aqueous stream with increased oxygenate content, and a gaseous stream with reduced oxygenate content.

As already noted, the first aqueous stream is suitably relatively clean water, by which is meant comprises at least 95 wt % water, such as at least 98 wt % water, and should be substantially free of any components that would react or complex with the carbon dioxide in step (b). The water may however contain components which aid oxygenate removal, as long as such components do not react or complex with the carbon dioxide to any great extent under the conditions used in the contacting step.

Typically, the first liquid hydrocarbon stream will absorb the less polar oxygenates that may be present in the first gaseous stream, said less polar oxygenates being those most likely to be absorbed by the first aqueous stream, to produce a second liquid hydrocarbon stream with increased oxygenate content and a gaseous stream with reduced oxygenate content. These oxygenates are typically those with longer hydrocarbon chains which are generally more lipophilic than shorter chain oxygenates.

The first liquid hydrocarbon stream is preferably a stream of one or more hydrocarbons which are liquid at 40° C. (at atmospheric pressure). Thus, the first liquid hydrocarbon stream may be a single (liquid) hydrocarbon. Preferably, however, a mixture of hydrocarbons is used. The hydrocarbon(s) preferably have a low volatility. Suitable mixtures are gasoline, diesel and gas oils, and mixtures having properties similar to such streams. (Hereinafter, reference to gasoline, diesel and gas oils, includes reference to mixtures having properties similar to such streams.)

Where the first gaseous stream is a product stream from an autothermal cracking process, the first liquid hydrocarbon stream preferably comprises, at least in part, "heavy end" hydrocarbons produced in the autothermal cracking process itself, by which is meant those produced in the autothermal cracking process and having a boiling point of at least 40° C., as described further below.

The first liquid hydrocarbon stream will also absorb at least some of any "heavy end" hydrocarbon components present in the first gaseous stream. Typical heavy end components which may be present where the first gaseous stream is the product stream from an autothermal cracking process include paraffinic, aromatic and olefinic hydrocarbons heavier than C5, such as hexane, toluene, naphthalene and benzene. If not removed from the first gaseous stream these components tend to accumulate in subsequent processing steps. The use of a first liquid hydrocarbon stream according to the process of the present invention has the advantage that such heavy end components are generally more soluble in the first liquid hydrocarbon stream than in water, and, hence, are more effectively removed from the first gaseous stream than using water.

The contacting of the gaseous stream comprising one or more mono-olefin(s), oxygenates, and carbon dioxide with the first aqueous stream in such a tower results in a second aqueous stream with increased oxygenate content which needs to be removed from said tower.

The second aqueous stream can be removed from any position in such a tower. Preferably, the removal of the second aqueous stream is from the base of the tower in which the contacting of the gaseous stream with the first aqueous stream is performed. The second aqueous solution (comprising oxygenates) may be recycled to the tower as the first aqueous stream. A portion of said recycle stream may be removed as a purge, and the removed solution replaced by fresh water to prevent build-up of oxygenates and to maintain the volume of solution.

Preferably, at least a portion of this second aqueous stream is treated to remove at least some of the oxygenates therein, before it is recycled and reused as the first aqueous stream. A preferred method of treatment is to pass the second aqueous stream comprising oxygenates to a water stripper, wherein said water is contacted with a stripping gas, such as air or nitrogen, but preferably steam, to remove at least some of said oxygenates, as described for treatment of water comprising oxygenates removed from any first preliminary oxygenate removal step. Prior to passing the second aqueous stream comprising oxygenates to the water stripper it is preferably treated to remove any organic phase that may be present, typically using a decanter.

Most preferably, prior to treatment to remove oxygenates, the second aqueous stream comprising oxygenates may be combined with other aqueous streams comprising oxygenates which may be obtained in the process of the present invention, and the combined stream treated to remove the oxygenates therein.

The contacting of the first gaseous stream comprising one or more mono-olefin(s), oxygenates, and carbon dioxide with the first liquid hydrocarbon stream in a tower results in a second liquid hydrocarbon stream with increased oxygenate content which needs to be removed from said tower.

The second liquid hydrocarbon stream can be removed from any position in a tower. Preferably, the removal of the second liquid hydrocarbon stream is from the base of the tower in which the contacting of the first gaseous stream with the first liquid hydrocarbon stream may be performed. The second liquid hydrocarbon stream (comprising oxygenates and "heavy end" hydrocarbon components) may be recycled to the tower as the first liquid hydrocarbon stream. Preferably, at least a portion of this second liquid hydrocarbon stream is treated to remove at least some of the oxygenates therein, before it is recycled and reused as the first liquid hydrocarbon stream. For example, a portion of said recycle stream may be removed as a purge, and the removed solution replaced by fresh liquid hydrocarbon stream to prevent build-up of oxygenates.

The removed liquid hydrocarbon stream (purge) may be burnt in an incinerator. However, it is preferred to utilise, rather than burn, as much of the liquid hydrocarbon stream as possible. For example, where the first liquid hydrocarbon stream is a gasoline or diesel stream, then the removed second liquid hydrocarbon stream may be treated to remove the oxygenates therein, and subsequently used as such.

A most preferred method of treatment of the second liquid hydrocarbon stream is to pass the second liquid hydrocarbon stream to a suitable contacting tower comprising a packed or trayed column, wherein said stream is contacted, preferably countercurrently, with water, and then to a distillation column.

The contacting tower has one or more theoretical stages, preferably more than 1 theoretical stages, and more preferably more than 5. The water stream removed from this tower comprises oxygenates and at least a portion of this stream is treated to remove the oxygenates therein, preferably by passing said stream to a water stripper, wherein said stream is contacted with a stripping gas, such as air or nitrogen, but preferably steam, to remove said oxygenates, as described previously. Prior to passing the water stream comprising oxygenates to the stripper it is preferably treated to remove any organic phase that may be present, typically using a decanter. Most preferably, prior to treatment to remove oxygenates, the water is combined with other aqueous streams comprising oxygenates which may be obtained in the process of the present invention, and the combined stream treated to remove the oxygenates therein.

On contact with the first gaseous stream, the first liquid hydrocarbon stream may also absorb at least some "light end" components therefrom, by which is meant components with a boiling point of less than 15° C. at atmospheric pressure. Typical components are C2-C4 olefins and alkanes, for example ethane and ethylene. It is desired to recover said components and, thus, in a preferred embodiment, the second liquid hydrocarbon stream, after contacting with water, is passed to a distillation column where it is treated to produce a light cut stream comprising light ends from the first gaseous stream which were absorbed on contact with the first liquid hydrocarbon stream and a purified liquid hydrocarbon stream.

Preferably the purified liquid hydrocarbon stream is removed as two separate cuts from the distillation column, with at least a portion of this purified liquid hydrocarbon stream being removed from the process, and with the remainder of the purified liquid hydrocarbon stream, preferably at least a portion of the "heavier" cut, being recycled as the first liquid hydrocarbon stream.

This has the further advantage that valuable "heavy end" hydrocarbon components of the autothermal cracking product stream which are suitable for other uses, for example in motor gasoline, are separated from the process and used as such.

The cut stream may be recombined with the second gaseous stream with reduced oxygenates content obtained after the contacting of the first gaseous stream with the first aqueous stream and the first liquid hydrocarbon stream according to the process of the present invention. The light cut stream may be recombined with the second gaseous stream with reduced oxygenates content at any suitable stage, and the resulting stream passed to conventional cracked gas treatment steps, such as carbon dioxide removal and olefin separation steps. However, since the light cut stream, as well as being free of oxygenates, is free of carbon dioxide, the light ends are preferably recombined with the second gaseous stream with reduced oxygenates content after said second gaseous stream with reduced oxygenates content has passed through a carbon dioxide removal step, such as an amine unit.

As described previously, the heavy ends comprise components with a boiling point of greater than 40° C. at atmospheric pressure, typically including paraffinic, aromatic and olefinic hydrocarbons heavier than C5, such as hexane, benzene, toluene and naphthalene.

To enhance separation in the distillation column, the first liquid hydrocarbon stream most preferably has a boiling point range that has a gap to the light ends components to be separated, most preferably in the range 60 to 120° C. at atmospheric pressure.

Typically the contacting of the first gaseous stream with the first aqueous stream is performed at a temperature between 5° C. and 100° C. preferably at a temperature of less than 50° C., and most preferably in the range from 15° C. to 40° C.

Typically, the contacting of the first gaseous stream with the first liquid hydrocarbon stream is performed at temperature between 5° C. and 100° C. preferably at a temperature of less than 50° C., and most preferably in the range from 15° C. to 40° C.

Preferably, the contacting of the first gaseous stream with the first aqueous stream and with the first liquid hydrocarbon stream are performed at the same temperature or at a lower temperature than any preliminary oxygenate removal step that may be present, so no additional heating is required prior to said contactings.

Typically, contacting of the second liquid hydrocarbon stream with water is performed at temperature between 5° C. and 100° C. preferably in the range from 5° C. to 60° C., and most preferably in the range from 15° C. to 40° C.

The pressure is preferably similar to the pressure of the step in which the first liquid hydrocarbon stream and the first gaseous stream are contacted, and, thus, preferably at a pressure in the range 5 to 35 barg, and most preferably at a pressure in the range 10 to 35 barg.

Typically, distillation of the second liquid hydrocarbon stream, after contact with water, is performed at a similar pressure to the contacting step of the second liquid hydrocarbon stream and water, and, thus, is preferably at a pressure in the range 5 to 35 barg, and most preferably at a pressure in the range 10 to 35 barg.

Wherein the first gaseous stream comprising one or more olefin(s), one or more oxygenates and carbon dioxide is a product stream resulting from an autothermal cracking process the paraffinic hydrocarbon feedstock to the autothermal reactor may suitably be ethane, propane or butanes. It may be substantially pure or may be in admixture with other hydrocarbons and optionally other materials, for example methane, nitrogen, carbon monoxide, carbon dioxide, steam or hydrogen.

The molecular oxygen-containing gas is suitably either oxygen or air.

Preferably, hydrogen is fed to the autothermal reaction with the hydrocarbon feed, molecular oxygen containing gas and any other feed components. Suitably, the molar ratio of hydrogen to oxygen is in the range 0.2 to 4, preferably, in the range 0.2 to 3.

The hydrocarbon and oxygen-containing gas may be contacted with the catalyst in any suitable molar ratio, provided that the ATC product stream comprising olefins is produced. The preferred stoichiometric ratio of hydrocarbon to oxygen is 5 to 16, preferably, 5 to 13.5 times, preferably, 6 to 10 times the stoichiometric ratio of hydrocarbon to oxygen required for complete combustion of the hydrocarbon to carbon dioxide and water.

Typically the reactants are passed over the catalyst at a pressure dependent gas hourly space velocity of greater than 10,000 $h^{-1}$ $barg^{-1}$, preferably greater than 20,000 $h^{-1}$ $barg^{-1}$ and, most preferably, greater than 100,000 $h^{-1}$ $barg^{-1}$. For example, at 20 barg pressure, the gas hourly space velocity is most preferably, greater than 2,000,000 $h^{-1}$.

The autothermal cracking step may suitably be carried out at a catalyst exit temperature in the range 600° C. to 1200° C. Suitably the catalyst exit temperature is at least 720° C. such as at least 750° C. Preferably, the autothermal cracking step is carried out at a catalyst exit temperature in the range 850° C. to 1050° C. and, most preferably, in the range 850° C. to 1000° C.

The most preferred pressures of any preliminary oxygenate removal step, the contacting of the first gaseous (product) stream with a first aqueous stream and with a first liquid hydrocarbon stream, and subsequent other treatment steps described herein, are generally based on the pressure of the autothermal cracking reaction. It is generally preferred that pressures in downstream processing steps are as close as possible to the autothermal cracking reaction pressure so that any compression of subsequent recycle streams (e.g unreacted hydrocarbons) to the autothermal cracking reaction is minimised, but, in practise, the actual pressure will decrease as the gaseous stream passes through the treatment steps due to inherent pressure drops.

The autothermal cracking catalyst may be any catalyst capable of supporting combustion beyond the fuel rich limit of flammability. The catalyst may comprise a Group VIII metal as its catalytic component. Suitable Group VIII metals include platinum, palladium, ruthenium, rhodium, osmium and iridium. Rhodium, and more particularly, platinum and palladium are preferred.

The product stream is usually quenched as it emerges from the reaction chamber to avoid further reactions taking place and the temperature of the stream is reduced to a temperature between 750-600° C.

In a preferred embodiment of the invention and wherein the first gaseous stream comprising one or more mono-olefin(s), one or more oxygenates and carbon dioxide is a product stream from an autothermal reactor the gaseous stream is passed through a heat exchanger prior to treating in step (b) of the process of the present invention.

The present invention will now be further described by reference to FIG. 1, wherein FIG. 1 is a schematic diagram of a preferred embodiment according to the present invention.

In FIG. 1 a high pressure paraffinic hydrocarbon feedstock, principally comprising ethane, is fed through line (1) to an autothermal cracker (2). Also fed to the autothermal cracker through line (3) is oxygen. The autothermal cracker (2) is maintained under conditions whereby reaction is effected to produce a product stream comprising ethene, propene, methane, ethane, carbon dioxide, carbon monoxide hydrogen and oxygenates. The product stream exits the autothermal cracker (2) via line (4) and is passed to a quench column (5) to reduce the temperature of the product gas to about 600° C., and subsequently further cooled (6) to approximately 30° C. The gaseous portion of the cooled product stream then passes to a quench tower (7) comprising four contacting sections. In the first contacting section (7a), the cooled gaseous stream is contacted with water (8a, 8b) in a packed column as a preliminary oxygenate removal step, to produce a stream comprising one or more mono-olefins, the remaining oxygenates, and carbon dioxide. In the second contacting step (7b) the cooled gaseous stream is directly contacted, countercurrently with a first hydrocarbon stream (9a, 9b) in a packed column. This stream then passes to a third contacting section (7c) comprising a packed column, wherein it is directly contacted, countercurrently, with a first aqueous stream (10a, 10b), and subsequently to a fourth contacting section (7d) wherein the stream is contacted with a further aqueous stream (11a, 11b). The resultant gaseous product stream comprising ethene, propene, methane, ethane, carbon dioxide, carbon monoxide and hydrogen and significantly reduced oxygenates content exits at the top of the tower (12) and is passed to a carbon dioxide removal zone (13).

EXAMPLE

The Example uses an apparatus as shown in FIG. 1. Ethane as paraffinic hydrocarbon was autothermally cracked in the presence of hydrogen and oxygen at a pressure of 10 barg. The resulting product stream was quenched and cooled, and the gaseous portion (at approximately 30° C.) was passed to a four contacting section column as described for FIG. 1. The pressure and temperature of each section of the contacting column operated at approximately 10 barg and 30° C.

The hydrocarbon used for the hydrocarbon contacting step was diesel.

The results are shown in Table 1, which shows the oxygenate content (ppm) of the cooled gaseous stream entering the four contacting section column and the analysis of the overhead gaseous stream exiting the column.

TABLE 1

| Oxygenates (principal and total) | Gaseous stream at column inlet (ppm) | Gaseous overhead stream (ppm) |
| --- | --- | --- |
| Acetaldehyde | 574 | 64 |
| Propanal | 41 | 12 |
| Acetone | 13 | 4 |
| Total | 644 | 81 |

The treatment with water and diesel results in a significant reduction (>85%) in oxygenate content in the product stream. Essentially all of the carbon dioxide and ethylene (>99%) remained in the overhead stream, showing negligible carbon dioxide or ethylene removal by the oxygenate removal treatment.

Consistent with the above data, analysis of a water stream after contacting showed absorption of the "lighter" oxygenates, including acetaldehyde, acetone, propanal, alcohols (including methanol, ethanol and propanol) and acids (including acetic acid and propionic acid).

Analysis of diesel after contacting also showed some absorption of the "lighter" oxygenates, although at lower concentrations than in the water, as well as absorption of "higher" hydrocarbons, including toluene, ethyl benzene, xylenes and styrene.

The invention claimed is:

1. A process for the removal of oxygenates from a gaseous stream also comprising carbon dioxide, said process comprising:
   a) providing a first gaseous stream comprising one or more mono-olefin(s), at least 100 ppm (by weight) of one or more oxygenates and at least 0.1 wt % carbon dioxide, and
   b) treating the first gaseous stream to produce a second gaseous stream comprising one or more mono-olefin(s) and at least 0.1 wt % carbon dioxide with reduced oxygenate content, wherein said treating comprises contacting the first gaseous stream with a first aqueous stream comprising at least 95 wt % water and with a first liquid hydrocarbon stream, and
   c) subsequently treating the second gaseous stream to remove the carbon dioxide therein, the majority of the carbon dioxide in the first gaseous stream being removed in step (c).

2. A process according to claim 1, wherein the first aqueous stream and the first liquid hydrocarbon stream each have less than 2 wt % of any components which would react or complex with the carbon dioxide.

3. A process according to claim 1 wherein the first liquid hydrocarbon stream comprises at least 95 wt % liquid hydrocarbons.

4. A process according to claim 1 wherein the first gaseous stream comprising one or more mono-olefin(s), at least 100 ppmw of one or more oxygenates and at least 0.1 wt % carbon dioxide is a product stream resulting from an autothermal cracking process wherein the process comprises partially combusting a mixture of a hydrocarbon feed and a molecular oxygen containing gas in contact with a catalyst capable of supporting combustion beyond the normal fuel rich limit of flammability.

5. A process according to claim 1 wherein the first gaseous stream comprising one or more mono-olefin(s), at least 100 ppm (by weight) of one or more oxygenates and at least 0.1 wt % carbon dioxide is provided at a pressure of at least 5 barg and the contacting of the first gaseous stream with the first aqueous stream and the first gaseous stream with the first liquid hydrocarbon stream are each performed at pressures of at least 5 barg.

6. A process according to claim 1 wherein the first gaseous stream comprising one or more mono olefins, at least 100 ppmw of one or more oxygenates and at least 0.1 wt % carbon dioxide also comprises molecular oxygen.

7. A process according to claim 1 wherein the oxygenates comprise at least one of an aldehyde, a ketone, an ester or a carboxylic acid, or a mixture thereof.

8. A process according to claim 1 wherein the first liquid hydrocarbon stream is a gasoline, diesel or gas oils.

* * * * *